(12) United States Patent
Speth et al.

(10) Patent No.: US 6,629,017 B1
(45) Date of Patent: Sep. 30, 2003

(54) METHOD AND DEVICE FOR CONTROLLING A TOOL FEED

(75) Inventors: Wolfgang Speth, Grossbottwar (DE); Wilhelm Westermeyer, Nürnberg (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/445,359

(22) PCT Filed: May 29, 1998

(86) PCT No.: PCT/DE98/01480

§ 371 (c)(1),
(2), (4) Date: May 2, 2000

(87) PCT Pub. No.: WO98/57240

PCT Pub. Date: Dec. 17, 1998

(30) Foreign Application Priority Data

Jun. 12, 1997 (DE) .......................................... 197 24 933

(51) Int. Cl.⁷ .............................................. G06F 19/00
(52) U.S. Cl. ....................................... 700/169; 700/188
(58) Field of Search ................... 700/188, 146, 700/170, 169, 160, 164, 174

(56) References Cited

U.S. PATENT DOCUMENTS

| | | | |
|---|---|---|---|
| 4,509,126 A | * 4/1985 | Olig et al. .................. | 700/713 |
| 5,200,680 A | * 4/1993 | Sasaki et al. ............... | 318/560 |
| 5,321,623 A | 6/1994 | Ensenat et al. ............. | 700/164 |
| 5,589,750 A | * 12/1996 | Idei et al. ................... | 318/569 |
| 5,661,669 A | * 8/1997 | Mozumder et al. ..... | 204/192.13 |
| 6,029,098 A | * 2/2000 | Serizawa et al. ........... | 700/188 |
| 6,161,055 A | * 12/2000 | Pryor ........................ | 382/152 |
| 6,225,772 B1 | * 5/2001 | Aizawa et al. .............. | 318/571 |

FOREIGN PATENT DOCUMENTS

| | | |
|---|---|---|
| DE | 43 10 126 | 10/1994 |
| EP | 0 490 431 | 6/1992 |
| EP | 0 706 104 | 4/1996 |

OTHER PUBLICATIONS

Schrufer: Signalverarbeitung—Numerische Verabeitung digitaler Signale [Signal Processing—Numerical Processing Of Digital Signals], Munich, Vienna, Hanser–Verlag 1990, pp. 77.

* cited by examiner

*Primary Examiner*—Leo Picard
*Assistant Examiner*—Kidest Bahta
(74) *Attorney, Agent, or Firm*—Staas & Halsey LLP

(57) ABSTRACT

A tool feeding speed profile is directly programmable, feeding speed minimums across the control blocks being used in advance in the event that the admissible axis dynamics are exceeded by the predefined feeding speed profile. The tool feeding speed profile can be programmed, in particular, as a linear, polynomial, or cubic feeding speed profile, the latter being predefinable over a sequence of control blocks as a feeding speed polynomial or a feeding speed spline by interpolation or approximation.

9 Claims, 3 Drawing Sheets

METHOD AND DEVICE FOR CONTROLLING A TOOL FEED

FIELD OF THE INVENTION

The present invention relates to a method and a device for controlling the tool feed of a numerically controlled machine tool, a robot or the like, with the feeding speed being specified for each control block.

BACKGROUND INFORMATION

In conventional numerical controls, for example, as used in machine tools, a feeding speed value that is constant over the block is programmed for each subprogram block. Such a constant feeding speed, however, is only useful if it is characteristic for the machining conditions or if the machining conditions are constant over the block.

A constant feeding speed is not useful, for example, if the subprogram directly defines a machine axis motion of a non-Cartesian machine. The feeding speed is not representative of the cutting conditions at the tool in such a case. If these cutting conditions are kept constant, which is advantageous, the predefined feeding speed must be changed.

A constant feeding speed is also disadvantageous, for example, if the cutting conditions at the tool change due to a varying contour curvature and thus to a varying work area of a milling machine, for example (e.g. spirals via circular volutes).

Therefore, feeding speed profiles are traditionally generated by subdividing a subprogram into a number of short blocks and defining a constant feed speed for each of these control blocks. The feeding speed profile thus predefined is traditionally a stepped feed profile, as shown in FIG. 2, where tool path B is represented by the abscissa, which is subdivided into a number of control blocks (represented in the form of vertical broken lines). Feeding speed F is plotted on the ordinate.

In order to make such a rigid stepped tool feeding speed profile more flexible, it has been suggested that a programmable feeding speed override profile be defined (see, in particular the method proposed by FANUC under the name FS15/MA involute interpolation). The conventional option of influencing speed by feeding speed override values is based on the fact that feeding speed override makes it possible to vary the programmed absolute feeding speed proportionally in the range of 0 to 200%, for example, in order to take changed technological conditions into account, for example, as a workpiece is being machined. In the conventional method, override interpolation points are defined along the length of the path and linear interpolation of the override value is performed between the override interpolation points.

In conventional system, the predefined stepped feeding speed profile is rounded according to the parametrization of the speed control and the dynamics of the servos and drives used. In addition to the disadvantage of a large number of subprogram blocks and thus unmanageably large subprograms, the paradoxical result of modern dynamic drives resulting in deteriorated quality is obtained.

Adaptation of the feeding speed via an override value also results in a time and, therefore, space lag of this adaptation due to the smoothing of the speed control. Therefore, the specifications (e.g., maximum possible contour accuracy) are considerably more difficult to meet.

SUMMARY

An object of the present invention is to provide a method and a corresponding device for controlling the feeding speed that allows maximum flexibility regarding tool feeding speed control and ensures that speed constraints are complied with regardless of machine dynamics, thus overcoming the disadvantage of a large number of subprogram blocks being necessary and guaranteeing optimum path accuracy.

According to the present invention, this object is achieved using a method for controlling the feeding speed of a numerically controlled machine tool, a robot, or the like, in which the feeding speed is specified over each control block, by the fact that a feeding speed profile is directly programmable, and in the event of an admissible axis dynamic being exceeded by the predefined feeding speed profile, feeding speed minimum values are used in advance across the control blocks.

In a first advantageous embodiment of the method according to the present invention, the feeding speed profile is defined as a linear tool speed profile.

In another advantageous embodiment of the method according to the present invention, the feeding speed profile is defined as a polynomial feeding speed profile over a control block or a sequence of control blocks.

In another advantageous embodiment of the method according to the present invention, the feeding speed profile is defined as a feeding speed spline over a sequence of control blocks.

The aforementioned advantageous refinements of the object of the present invention allow the feeding speed to be defined in a more accurate manner in that it can be extended by linear and cubic curves. Cubic curves can be programmed directly or as interpolating or approximating splines. This allows continuous and smooth feeding speed curves to be programmed, depending on the curvature. Such speed curves allow smooth changes in acceleration and thus, for example, the manufacture of more even workpiece surfaces.

In another advantageous embodiment of the method with the feeding speed being predefined as a feeding speed spline or feeding speed polynomial, feeding speed setpoint values are defined as interpolation points of the feeding speed spline or feeding speed polynomial, which are connected to one another via an interpolating spline or an interpolating polynomial.

In another advantageous embodiment according to the present invention, the definition of the feeding speed as a polynomial feed profile is refined via a sequence of control blocks or as a feed spline so that the feeding speed setpoint values are defined as interpolation points at the control block transitions via a predictor algorithm, between which points an approximating spline or an approximating polynomial of the feeding speed is defined.

In another advantageous embodiment of the method according to the present invention, it is also achieved that the speed constraints are observed even during the beginning of the feeding speed profile regardless of the machine dynamics. This is achieved in that the feeding speed profile is started taking into account the admissible axis dynamics with smoothing of the tool speed control.

In another advantageous embodiment of the method according to the present invention, it is also achieved that axis overload after a stop or a sudden change in the feeding speed profile can be avoided. This is accomplished by the fact that in the event of a sudden change in the feeding speed and/or in the event of changes in a feeding speed override value, feeding speed control smoothing can be activated.

In another advantageous embodiment of the method according to the present invention, minimum error is achieved in the feeding speed profile method in that a feeding speed started is run with compensated or disabled smoothing of the speed profile.

In order to implement the method according to the present invention and the advantages associated therewith in order to achieve the object stated above in a particularly effective manner, a device is proposed for controlling the feeding speed of a numerically controlled machine tool, a robot, or the like, having a feeding speed that can be defined over each control block. The device which is characterized by the fact that a feeding speed can be directly programmed, and in the event of an admissible axis dynamic being exceeded by the predefined feeding speed profile, feeding speed minimum values can be used in advance across the control blocks.

DETAILED DESCRIPTION

For the sake of greater clarity, we shall begin with the different programmed feeding speed profiles according to FIGS. 2 through 5 are first described.

Figure 2:
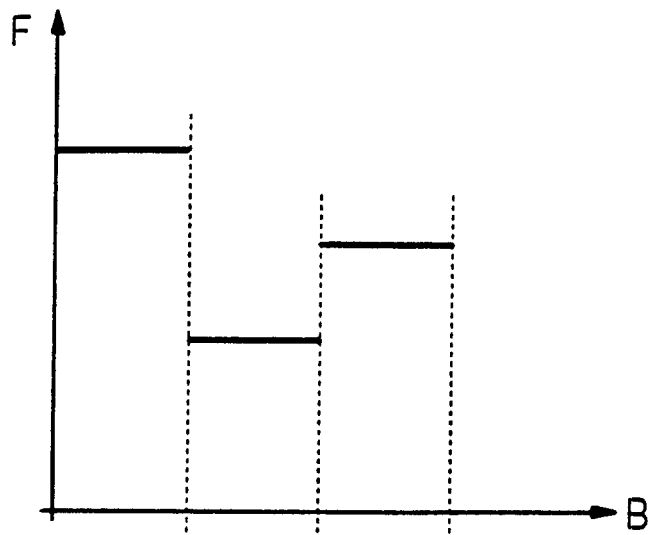
FIG. 2 shows a stepped feeding speed profile according to the conventional system.
Figure 3:
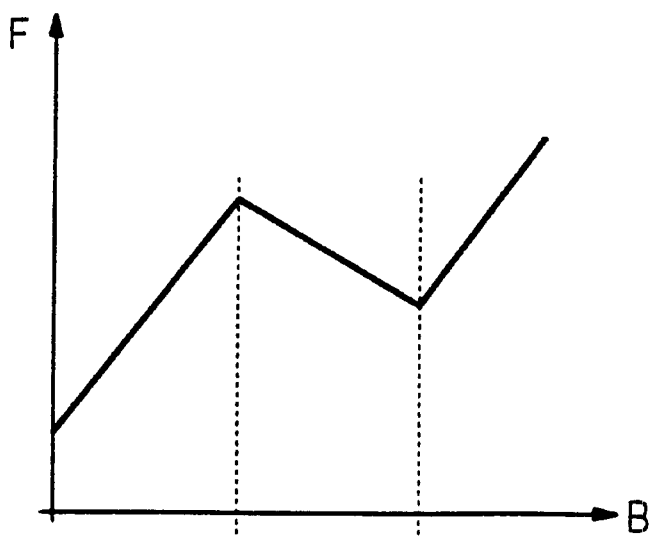
FIG. 3 shows an example of programming of a linear feeding speed profile.

The embodiment of FIG. 2, which describes a stepped feeding speed profile according to a conventional system, has been described above. In FIG. 3 feeding speed F is also plotted on the abscissa against path B on the ordinate, as explained above with reference to FIG. 2. Path B is subdivided into a plurality of control blocks, which is represented by vertical broken lines. The feeding speed curve shown is traveled linearly from the instantaneous value at the beginning of the block to the end of the block via path B and is then used as a modal value. Such a linear feeding speed curve is referred to hereinafter as FLIN, while a constant feeding speed value illustrated in FIG. 2 is referred to as FNORM.

Figure 4:
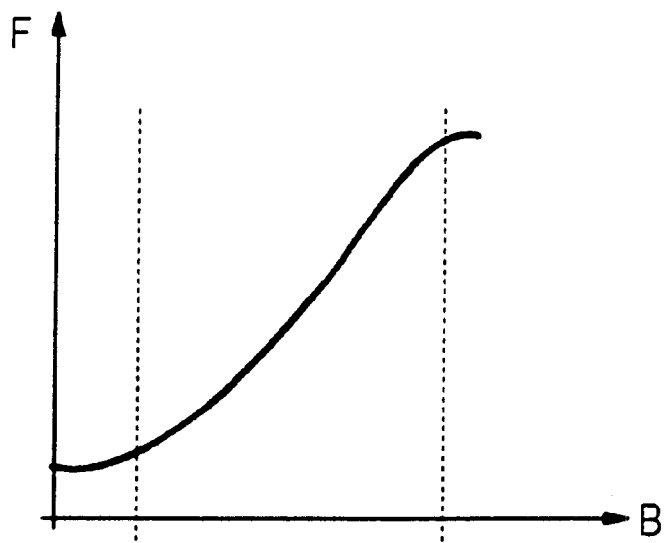
FIG. 4 shows a polynomial feeding speed via a control block.

In FIG. 4, which has the same design in principle as FIGS. 2 and 3, the feeding speed is directly programmed via a polynomial. A polynomial feeding speed is shown over a single control block, in which the curve is drawn from the instantaneous value to the block end via a polynomial. The its end value is then used as a modal value. Such a polynomial feeding speed curve is referred to hereinafter as FPO. Of course, a feeding speed polynomial spanning a sequence of a plurality of control blocks is also possible. Such a polynomial feeding speed profile FPO can be designed as an interpolating polynomial or an approximating polynomial.

In the case of interpolation, the feed profile sought passes through the predefined interpolation points, so that the function found allows the feeding speed curve to be drawn between the interpolation points. In the case of approximation, the feed profile sought is drawn through the interpolation points according to a predefined strategy without the approximated value necessarily coinciding with the desired feeding speed value of the interpolation point at the interpolation points.

Figure 5:
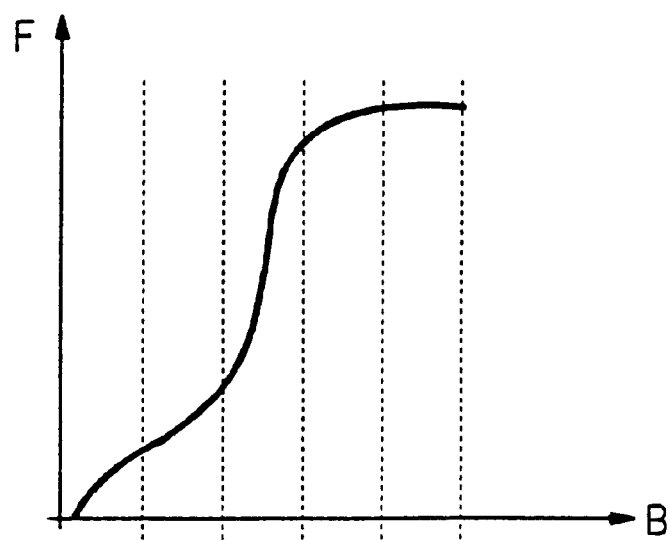
FIG. 5 shows an example of a cubic feeding speed profile via spline interpolation over a plurality of control blocks.

FIG. 5, which is based on the same principle as the previous figures, is an example of programming of a cubic feeding speed profile using a feeding speed spline. This feeding speed spline is defined via a sequence of control data blocks, which are again represented by vertical broken lines along path B. A spline is a function composed piece by piece by polynomials. Cubic parabolas, each passing through two interpolation points may be used for this purpose. For n interpolation points, the spline function is composed of n−1 individual polynomials. Spline interpolation is thus performed (concerning spline interpolation methods, see, for example, Schrufer: Signalverarbeitung—Numerische Verarbeitung digitaler Signale (Signal Processing—Numerical Processing of Digital Signals), Munich, Vienna, Hanser-Verlag 1990, p. 77 ff.).

In industrial practice it is not very helpful, in some cases, to force the spline function to pass exactly through all interpolation points. It is more convenient to perform an adjustment and use an approximating, rather than an interpolating spline. This method is based on the idea of drawing cubic polynomials that pass through the interpolation points and initially have still unknown ordinate values so that the differences are positively proportional to the jumps of the third derivative of the spline function (see the relevant details in the previously mentioned work by Schrufer, p. 81 ff).

In the case of spline interpolation, the feeding speed varies cubically from the instantaneous feed value to the programmed feed value. The feeding speed values programmed block by block are connected, with reference to the block end point, by a spline. The spline begins and ends tangentially to the previously and subsequently defined feeding speeds. The feeding speed values are used here as interpolation points to calculate the spline interpolation. A feeding speed profile thus drawn as a cubic curve is referred to hereinafter as FCUB. In a similar manner, spline approximation can be derived from the above discussion.

Interpolation points for determining an FCUB feeding speed spline or an FPO feeding speed polynomial can be defined, for example, via a predictor algorithm at the respective control block transition.

Interpolation of the feeding speed profile of one block using a predictor algorithm may have the following aspect:

Start point: instantaneous feed position s0 and feed speed v0

1. Estimating the future feed position using linear extrapolation with $s11=s0+v0*Ti$ and the respective feeding speed with v11=feeding speed profile (s11) taking into account an override value that arises, where Ti=interpolation cycle =>s0, v0, s11, v11

2. Improving the estimated values via v11 according to $s12=s0+(v0+v11)/2*Ti$ and v12=feeding speed profile (s12) and possibly also acceleration according to $a12=v12*d(\text{feeding speed profile})/dt$, where s=s12 taking into account an override value that arises =>s0, v0, v12, a12

3. Start from v12 and optionally a12 observing the acceleration and any rate-of-change limitation, and taking into account the feeding speed minimums and dynamic limits => new tool feed position s1 and tool feeding speed v1 ->back to 1.

In the following, the use of the previous different programmable feeding speed profiles according to the present invention illustrated above are elucidated in detail with reference to an exemplary subprogram. The feeding speed programming according to DIN 66025 has been extended for this exemplary subprogram with linear and cubic curves according to the previously explained notations FLIN, FPO, and FCUB. The cubic curves can be programmed directly as interpolating or approximating splines or polynomials. The exemplary subprogram has 15 control blocks N1 to N15 and is composed of the following instructions:

| N1  | F1000 FNORM G1 X8 G91 G64 |
| --- | --- |
| N2  | F2000 X7 |
| N3  | F=FPO (4000, 6000, −4000) X16 |
| N4  | X6 |
| N5  | F3000 FLIN X5 |
| N6  | F2000 X8 |
| N7  | X5 |
| N8  | F1000 FNORM X5 |
| N9  | F1400 FCUB X8 |
| N10 | F2200 X6 |
| N11 | F3900 X7 |
| N12 | F4600 X7 |
| N13 | F4900 X5 |
| N14 | FNORM X5 |
| N15 | X20 |

Figure 1:
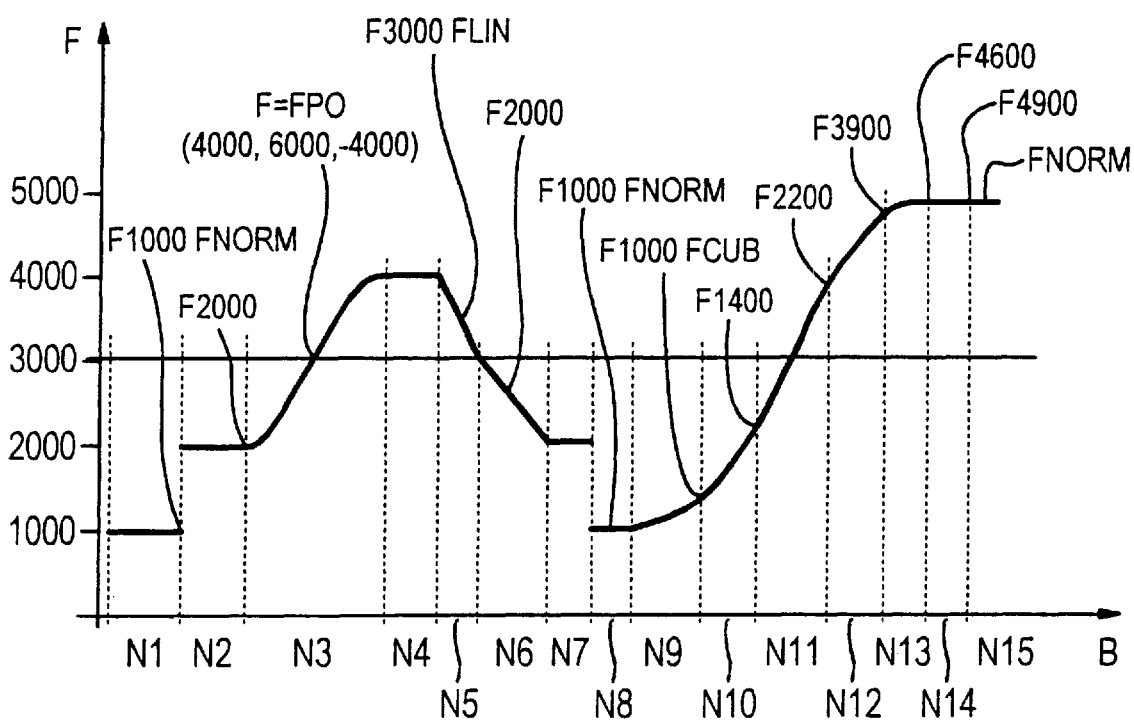
FIG. 1 shows an embodiment using graphic representation of the programming of different feeding speed profiles according to the present invention.

In FIG. 1, the desired feeding speed profile obtained from the exemplary subprogram is illustrated. The abscissa describes the path B, the ordinate describes feeding speed F. Path B is subdivided into individual blocks N1 to N15 of the exemplary subprogram, as represented by vertical broken lines. The feeding speed resulting from the feeding speed programming of the respective control block is plotted between those lines. Control block N1 has a constant feeding speed profile. In control block N2 there is a sudden acceleration change, whereupon in block N3 the feeding speed profile follows a polynomial with feeding speed 4000 at the block end. Control block N4 describes a constant feeding speed profile (polynomial feeding speed applies as a modal value). Control blocks N5 and N6 have a linearly decreasing feeding speed profile; control block N7 again describes a constant feeding speed profile (linear feeding speed applies as a modal value). Control block N8 has a constant feeding speed profile with a sudden change in acceleration. In control blocks N9 to N13, the feeding speed values programmed block by block are connected via splines. In control block N13, the spline profile is disabled and a constant feeding speed profile follows again.

Figure 6:
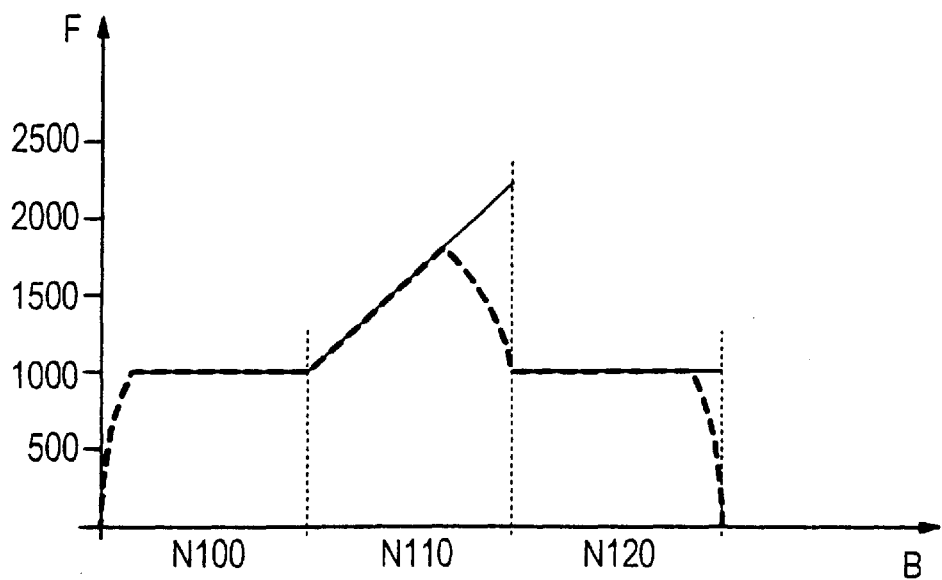
FIG. 6 shows an example of feeding speed programming and actual feeding speed profile.

In order to ensure that the speed constraints are observed regardless of the machine dynamics, in the event of an admissible axis dynamic being exceeded by the predefined feeding speed profile, feeding speed minimum values across the control blocks are used in advance. This relationship is illustrated in FIG. 6. Path B is plotted on the abscissa and feeding speed F is plotted on the ordinate again. Three control blocks N100, N110, and N120 are shown. The two blocks N110 and N120 have a constant feeding speed profile FNORM, while control block N110 has a linear feeding speed profile FLIN. As in FIG. 1, the desired feeding speed profile is shown in solid lines. The actual feeding speed profile is shown by a broken curve. At the beginning of control block N100 and at the end of control block N120, it can be seen from the actual feeding speed profile, how the desired feeding speed profile is rounded due to the servo and drive dynamics. In control block N110 having a linear feeding speed profile FLIN, it can be seen that the local minimum at the beginning of block N120 is used in advance by the tool feed, since otherwise the predefined feeding speed profile would exceed the allowed axis dynamics.

Observing the allowed axis dynamics, active smoothing of the feeding speed control may also occur in the event that the feeding speed profile starts after a stop or a jump in the feeding speed or in the event of changes in a feeding speed override value, in order to observe the speed constraints of the machine dynamics. A feeding speed profile already begun, however, can be subsequently followed with compensated or disabled smoothing of the speed control. Thus and due to the above-mentioned predictor algorithm (which delivers almost exactly the desired feeding speed at the interpolation point to be determined), the feeding speed profile can be used with negligible error. In the case of curved path segments, the feeding speed can be optimized by leaving any feeding speed polynomial FPO or a feeding speed spline FCUB provided only with a constant cutting speed. This allows a desired feeding speed profile having a constant acceleration to be generated. In addition, monitoring can be performed to ensure that the above-mentioned smoothing of the speed control is reactivated without sudden changes in the event of an axis overload.

The above description of preferred embodiments according to the present invention is provided for the sake of clarity. It is not exhaustive. Neither is the present invention limited to the exact form described, but numerous modifications and changes are possible within the preceding technical teaching. A preferred embodiment was selected and described in order to illustrate the details in principle of the present invention, and to allow those skilled in the art to implement the invention. A plurality of preferred embodiments and other modifications may be used in specific fields of application.

What is claimed is:

1. A method of controlling a tool feed speed, the feed speed being controlled via control blocks, the method comprising:

directly programming a profile of the feed speed, the profile of the feed speed being directly programmed over at least one of the control blocks as at least one of a polynomial, a spline, and a linear feeding profile; and if admissible axis dynamics are exceed by the profile, using feeding speed minimums in advance across the control blocks.

2. The method according to claim 1, further comprising:

defining desired tool feeding speed values as interpolation points of at least one of the polynomial and the spline at each control block transition via a predictor algorithm, the tool feeding speed values being connected by one of an interpolating polynomial and interpolating spline.

3. The method according to claim 1, further comprising:

defining desired tool feeding speed values as interpolation points of at least one of the polynomial and the spline at each control block transition via a predictor algorithm, the tool feeding speed values being connected by one of an approximating polynomial and an approximating spline.

4. The method according to claim 1, further comprising:

entering the profile with the admissible axis being observed and with smoothing of the feeding speed control.

5. The method according to claim 1, further comprising:

in an event of one of: i) a jump in the feeding speed, and ii) changes in a feeding speed override value, activating smoothing of feeding speed control.

6. The method according to claim 1, further comprising:
performing one of: i) compensating, and ii) disabling smoothing of the profile.

7. The method according to claim 1, wherein the tool speed is for one of i) a numerically controlled machine tool and ii) a robot.

8. A device for controlling a tool feed speed, comprising:
control blocks for controlling the tool feed speed; and
an arrangement for directly programming a profile of the feed speed, the profile of the feed speed being directly programmed over at least one of the control blocks as at least one of a polynomial, a spline, and a linear feeding profile, wherein if admissible axis dynamics are exceed by the profile, feeding speed minimums are used in advance across the control blocks.

9. The device according to claim 8, wherein the tool feed speed is for one of: i) a numerically controlled machine tool, and ii) a robot.

* * * * *